US008001413B2

(12) United States Patent
Wetmore et al.

(10) Patent No.: US 8,001,413 B2
(45) Date of Patent: Aug. 16, 2011

(54) MANAGING CLUSTER SPLIT-BRAIN IN DATACENTER SERVICE SITE FAILOVER

(75) Inventors: Alexander R Wetmore, Seattle, WA (US); Gregory Thiel, Black Diamond, WA (US); Ayla Kol, Sammamish, WA (US); Rebecca Benfield, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 308 days.

(21) Appl. No.: 12/115,536

(22) Filed: May 5, 2008

(65) Prior Publication Data

US 2009/0276657 A1 Nov. 5, 2009

(51) Int. Cl.
*G06F 11/00* (2006.01)

(52) U.S. Cl. ............. 714/3; 714/4.1; 714/4.2; 714/4.21; 714/43

(58) Field of Classification Search .................. 714/1, 3, 714/4, 11, 13, 15, 43, 4.1, 4.11, 4.2, 4.21, 714/4.3, 4.4; 709/201
See application file for complete search history.

(56) References Cited

U.S. PATENT DOCUMENTS

| 5,828,889 | A  | * | 10/1998 | Moiin et al. ............... 714/15 |
| 6,675,199 | B1 |   | 1/2004  | Mohammed et al. |
| 6,920,580 | B1 |   | 7/2005  | Cramer et al. |
| 6,944,788 | B2 |   | 9/2005  | Dinker et al. |
| 7,117,393 | B2 |   | 10/2006 | Baba et al. |
| 7,234,075 | B2 |   | 6/2007  | Sankaran et al. |
| 7,246,256 | B2 |   | 7/2007  | De La Cruz et al. |
| 7,380,163 | B2 | * | 5/2008  | Davies et al. ............... 714/9 |
| 7,392,425 | B1 | * | 6/2008  | Schoenthal et al. ............... 714/7 |
| 2003/0005350 | A1 | * | 1/2003  | Koning et al. ............... 714/4 |
| 2003/0159084 | A1 | * | 8/2003  | Murphy et al. ............... 714/13 |
| 2003/0195955 | A1 |   | 10/2003 | Cochran et al. |
| 2004/0205148 | A1 |   | 10/2004 | Bae et al. |
| 2006/0168192 | A1 |   | 7/2006  | Sharma et al. |
| 2006/0253727 | A1 |   | 11/2006 | Leveille et al. |
| 2007/0083641 | A1 | * | 4/2007  | Hu et al. ............... 709/224 |
| 2007/0100964 | A1 | * | 5/2007  | Davies et al. ............... 709/217 |
| 2007/0245167 | A1 | * | 10/2007 | De La Cruz et al. ............... 714/4 |

OTHER PUBLICATIONS

"High Availability with Cisco Active Network Abstraction", 1992-2007, Cisco Systems.
"Site Resilience Configurations", 2007, Microsoft Corporation.
Fischer, "Implementation of a Disaster Resilient Linux Cluster with Storage Subsystem Based Data Replication", Jun. 2004, Werner Fischer.

* cited by examiner

*Primary Examiner* — Robert W Beausoliel, Jr.
*Assistant Examiner* — Joseph D Manoskey

(57) ABSTRACT

A central controlling service for datacenter activation/deactivation control in a cluster deployment to assist in preventing a split-brain scenario. The central controlling service provides a central point of control in the datacenter for application servers to periodically query as to whether to go offline, online, or normal. Redundancy of the central service facilitates detection of datacenter failure by the redundant services interacting to resolve the state of control information. This control information is then used to answer the server queries. On startup from a datacenter failure, a single instance of the central service queries other redundant instance(s) to determine if the single instance is starting up from a datacenter-wide failure or from operations other than total datacenter failure. If the failure is datacenter-wide, a central service protocol assists in resolving to the single service keeping the associated datacenter servers offline; otherwise, the server queries are answered to go online.

20 Claims, 6 Drawing Sheets

MANAGING CLUSTER SPLIT-BRAIN IN DATACENTER SERVICE SITE FAILOVER

BACKGROUND

Historically, computing clusters that span physical locations are challenged to differentiate a network failure between the two datacenters from an actual service failure in the active datacenter. One conventional solution to this problem is the addition of a third datacenter. The third datacenter is effectively a "witness" and can vote as to which of the two datacenters should have services up. However, while this provides a suitable solution, this also increases the networking and facility costs. Moreover, a weakness of this solution is that the WAN (wide-area network) networking failures can cause service outages in the active datacenter. It can be argued that customers should not experience a concurrent outage of both WAN networks, if deployed on independent hardware. An alternative solution is to create a second network connection between the two locations that is failure independent of the first. This also adds complexity to the deployment and it becomes difficult to determine what represents a failure-independent connection.

In a two-datacenter configuration customers are obligated to inject operational procedures into the solution. A solution can be created by manually activating the messaging solution in the passive datacenter (initially, datacenter2). However, this still does not address the behavior of the messaging solution in the active datacenter (initially, datacenter1). For example, a power failure in the active datacenter (datacenter1) can trigger the activation of the passive datacenter (datacenter2) messaging deployment; making it now the active datacenter. If the datacenter1 has power restored without a connection to the datacenter2 (or manual intervention) then the datacenter1 will automatically return to service, thereby creating a "split-brain" condition. This is "split brain" because both datacenter1 and datacenter2 messaging solutions are in service.

A second aspect of the problem is managing site resilience for a large scale service deployment. In the large-scale deployment case the number of systems with which an operation team must interact limits the timeliness of the recovery. In a service environment maximizing service uptime is essential. Thus, the resource intensive aspect of the large-scale deployment increases downtime for the service, and thus, further degrades the customer experience.

SUMMARY

The following presents a simplified summary in order to provide a basic understanding of some novel embodiments described herein. This summary is not an extensive overview, and it is not intended to identify key/critical elements or to delineate the scope thereof. Its sole purpose is to present some concepts in a simplified form as a prelude to the more detailed description that is presented later.

Disclosed is a mechanism that addresses the complexity of a solution and the three datacenter requirements of site resilience in a messaging deployment. The mechanism includes a datacenter activation coordinator (DAC) that when added to a cluster deployment assists in controlling activation of an associated datacenter and prevents inappropriate activations. The DAC provides a central point of control in the datacenter by making servers, (e.g., servers operating in an active/passive configuration) periodically query the DAC. In the passive datacenter (datacenter2, initially), the DAC coordinates messaging service activation in parallel across the respective servers. In the active datacenter (datacenter1, initially) the DAC can prevent the inappropriate activation of the original services, thereby preventing the split-brain situation.

The DAC serves as a central controlling entity for datacenter activation control by using a "mommy may I model" to control the datacenter servers that comprise the messaging solution, for example, particularly those datacenter servers that operate in an active/passive resource configuration. Additionally, activation of the passive datacenter is performed by modifying the data on the centralized (per datacenter) DAC. Moreover, the redundancy of the central controlling entity (the DAC) can be leveraged to automatically detect entire datacenter failures and therefore prevent the split-brain scenario. This is done by having the "allowed online" state to be reset when all DAC servers go offline at the same time. Subsequent "mommy may I" queries from datacenter servers receive a "stay offline" response until explicitly changed or full connectivity between the two datacenters is restored. Split brain is prevented by having the central entity block activation—when necessary—of the messaging resources that operate in an active/passive clustered model.

The solution activates the passive datacenter (datacenter2, initially) where a set of redundant servers exist to service requests when required; thus making it the active datacenter. By default the "mommy may I" answer is set to "do not activate", until the passive datacenter is instructed to activate by an administrator. When a subsequent server query yields an answer to "activate", the appropriate action (e.g., startup) is initiated, and the results are posted back to the DAC. By using a polling architecture where the datacenter server periodically querying the DACs, the solution can scale up. Changing the state of the servers involves only changing the state of the control tables for the DAC. Queries can be run against the data to determine what recovery action to take for the reported failures. The nature of the solution in the original active datacenter (datacenter1) is similar. The DAC is regularly queried to determine whether services and servers are to be up and providing service.

One characteristic of the set of redundant DACs is the startup behavior. Since a single DAC is part of a redundant server set at least one DAC server is running at all times. As part of DAC server startup, the DAC server queries the other DAC servers. If the other servers are all starting then the DAC server assumes a complete power failure and blocks all messaging service activation to the datacenter application servers, thereby preventing a split-brain scenario. This provides the protection required for the two datacenter configuration.

To the accomplishment of the foregoing and related ends, certain illustrative aspects are described herein in connection with the following description and the annexed drawings. These aspects are indicative of the various ways in which the principles disclosed herein can be practiced, all aspects and equivalents of which are intended to be within the scope of the claimed subject matter. Other advantages and novel features will become apparent from the following detailed description when considered in conjunction with the drawings.

DETAILED DESCRIPTION

Figure 1:
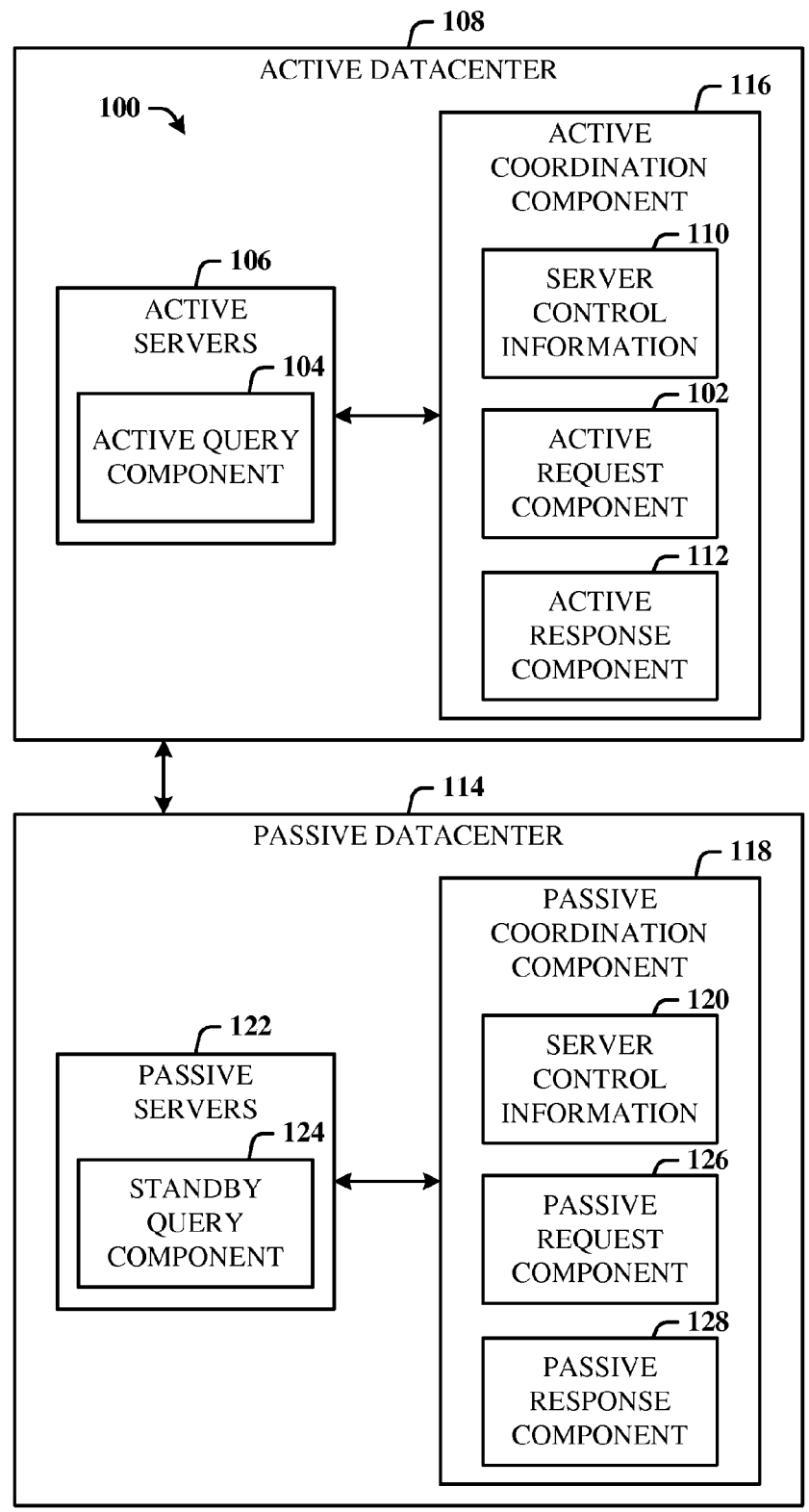
FIG. 1 illustrates a computer-implemented system for managing datacenters.

The disclosed architecture is central controlling service for datacenter activation/deactivation control in a cluster deployment to assist in preventing a split-brain scenario. The central controlling service provides a central point of control in the datacenter for application servers to periodically query as to whether to go offline or online. Redundancy of the central service facilitates detection of datacenter failure by the redundant services interacting to resolve the state of control information. This control information is then used to answer the server queries. On startup from a datacenter failure, a single instance of the central service queries other redundant instance(s) to determine if the single instance is starting up from a datacenter-wide failure or from operations other than total datacenter failure. If the failure is datacenter-wide, a central service protocol assists in resolving to the single service keeping the associated datacenter servers offline; otherwise, the server queries are answered to go online.

Reference is now made to the drawings, wherein like reference numerals are used to refer to like elements throughout. In the following description, for purposes of explanation, numerous specific details are set forth in order to provide a thorough understanding thereof. It may be evident, however, that the novel embodiments can be practiced without these specific details. In other instances, well known structures and devices are shown in block diagram form in order to facilitate a description thereof. The intention is to cover all modifications, equivalents, and alternatives falling within the spirit and scope of the claimed subject matter.

FIG. 1 illustrates a computer-implemented system 100 for managing a datacenter. The system 100 includes an active request component 102 for receiving requests from an active query component 104 of active servers 106 of an active datacenter 108 for server control information 110. The system 100 also includes an active response component 112 for sending answers to the active servers 106 (via the active query component 104) to control the active servers 106 to prevent a split-brain scenario between the active datacenter 108 and a passive datacenter 114.

The server control information 110 includes state indicating whether service is online or offline, and applies to each of the active servers 106 or a subset of the active servers 106. The active servers 106 of the active datacenter 108 can be mailbox server applications, for example, or application servers, in general.

The active request component 102, the active response component 112, and the server control information 110 can be embodied as part of a central active coordination component 116 such that the active coordination component 116 can store the server control information 110 and manage the active servers 106 when a datacenter-wide failure occurs (e.g., power outage).

Similarly, the passive datacenter 114 includes a passive coordination component 118 that stores its server control information 120 for controlling server state of passive servers 122.

The passive servers 122 include a passive query component 124 for sending requests to a passive request component 126. The passive coordination component 118 can include the passive request component 126 and a passive response component 128 for sending answers to the passive servers 122 (via the passive query component 124) to control the passive servers 122 to prevent a split-brain scenario between the active datacenter 108 and the passive datacenter 114.

It is to be appreciated that there is a role reversal scenario between the active datacenter 108 and passive datacenter 114 based on the failure. For example, when the active datacenter 108 is operating properly, the passive datacenter 114 is in a "standby" mode. However, when the active datacenter 108 fails, the active datacenter 108 goes into the passive datacenter role and the passive datacenter 114 assumes the active datacenter role. When the failure of the offline datacenter (datacenter 108) is corrected, an administrator can then choose to switch roles back by making the offline datacenter (datacenter1) the active datacenter, and taking the now active datacenter (datacenter2) to the passive (or offline) role.

In one specific implementation, the servers (106 and 122) of the datacenters provide mailbox application services. Some or all of the servers can operate in an active/passive configuration. The activation is coordinated to prevent concurrent activation of the servers (passive) in a same mode in two or more datacenters such as a split-brain scenario. Each datacenter (108 or 114) is configured with redundancy in the respective coordination component for monitoring state of the servers in the datacenter and changing state of the servers in the datacenter based on directives from the administrator or deduced desired state. The returning active datacenter 108 (after a fault such as a power failure) deduces its desired state to be offline via the active coordination component 116. Each server of the active datacenter 108 queries the coordination component 116 for activation information that defines if each server (or groups of servers) of the datacenter 108 will be activated or deactivated. The activation information is stored in the coordination component as the server control information 110.

In an alternative embodiment, a coordination component (e.g., active coordination component 116) comprises redundant computing systems (as activation controllers) deployed in order to provide the desired availability of the datacenter server applications (e.g., mailbox server applications) at a more granular level, such as according to subsets of the servers. For example, the datacenter (e.g., active datacenter 108) servers might be controlled on an individual or group basis, rather than a datacenter basis and their associated coordination component (e.g., active coordination component 116) can be configured to manage datacenter services by servers, or groups of servers and/or services.

Multiple redundant computing systems (operating as redundant activation controllers) can be provided such that one set of redundant computing systems (activation controllers) communicates with a first subset of the servers and/or services of the datacenter, a second set of redundant computing systems (activation controllers) communicates with a second subset of the servers and/or services of the datacenter, and so on. Thus, if the first set subset of servers and/or services fails in the active datacenter, the coordination component facilitates activation of a corresponding passive set of servers and/or services, which can be accomplished manually by an administrator.

More specifically, the server applications 106 of the active datacenter 108 periodically poll the associated active coordination component 116 for control information. The active coordination component 116 continues to provide the appropriate answer based on state of the active datacenter 108. For example, the active coordination component 116 can return an answer based on an administrator previously either inputting the answer to the active coordination component 116 or the active coordination component 116 computes the answer (or response). In the alternate embodiment the answer might be different per server.

Figure 2:
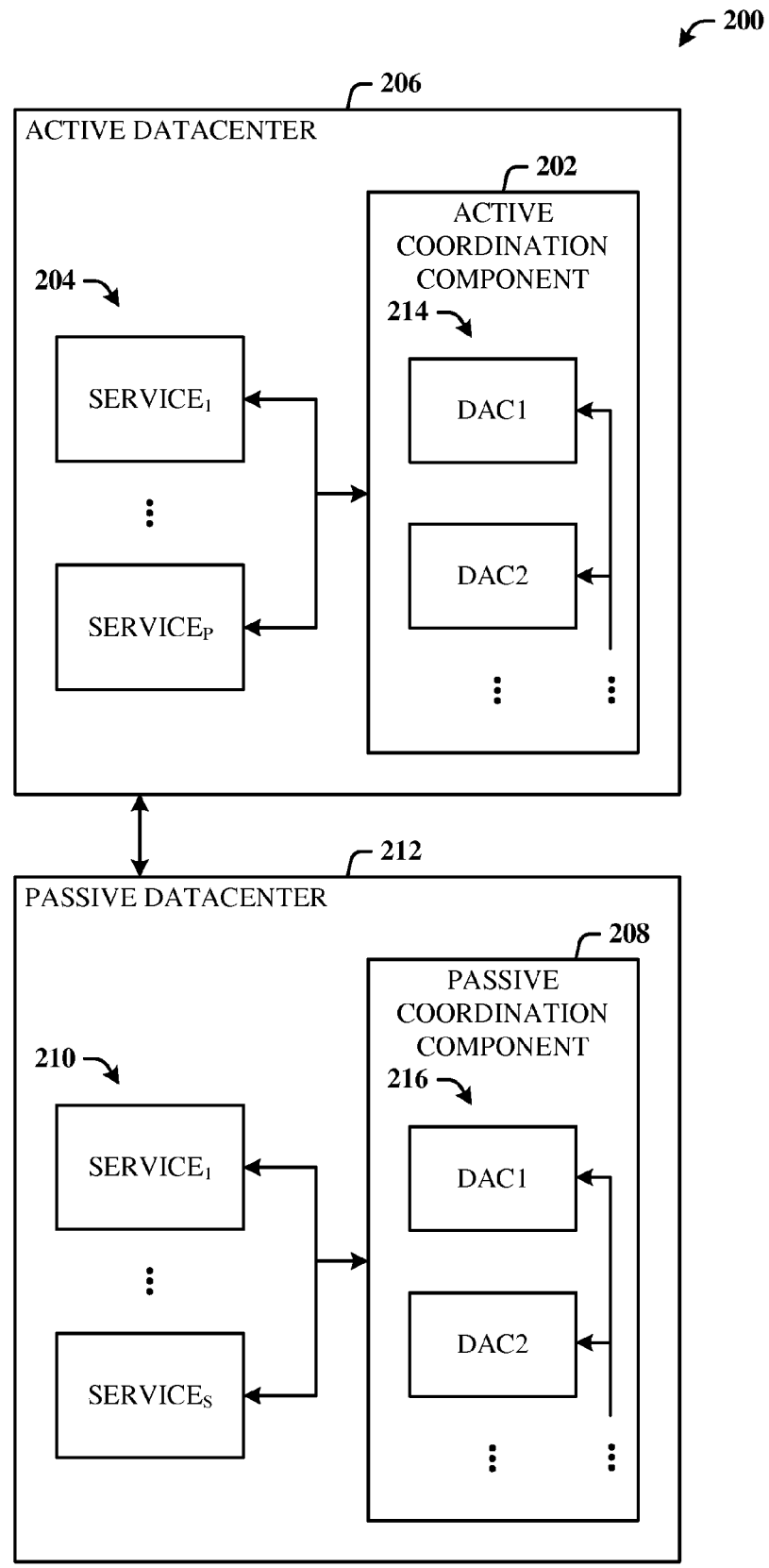
FIG. 2 illustrates a system that employs datacenter activation coordinators for the coordination of active and passive messaging datacenters.

FIG. 2 illustrates a system 200 that employs datacenter activation coordinators (DACs) for the coordination of active and passive messaging datacenters. The system 200 includes an active coordination component 202 for controlling message services 204 of an active datacenter 206, and a passive coordination component 208 for controlling message services 210 of a passive datacenter 212.

As illustrated, the active coordination component 202 comprises two or more redundant DACs 214 that interface to the active datacenter services 204 to receive and process service queries. Similarly, the passive coordination component 208 can comprise two or more redundant DACs 216 that interface to the passive datacenter services 210 to receive and process service queries. Each of the active DACs 214 can include the server control information 110, active request component 102, and active response component 112 of FIG. 1. Similarly, each of the passive DACs 216 can include the server control information 120, passive request component 126, and passive response component 128 of FIG. 1.

Where multiple active DACs 214 are employed, the multiple active DACs 214 can intercommunicate to provide coordination management of the active services 204 to detect if a failure has occurred. Similarly, where multiple passive DACs 216 are employed, the multiple passive DACs 216 can intercommunicate to provide coordination management of the passive services 210 for the passive datacenter 212.

The active datacenter 206 may be deactivated by an administrator or due to fault conditions such as a power failure. Under a fault condition, when power returns to the active datacenter 206, the associated DACs 214 are reset to a "don't come to the online state", and maintain the active services 204 in an offline (or down) state. The passive datacenter 212 is then activated by the administrator to provide high availability of the services 210.

The DACs 214 collect status when a datacenter activation or deactivation occurs. The DACs 214 then expect the services 204 to post status on whether the services 204 were successful at performing the directed transition. If the services 204 failed at the transition, this failed transition information is useful, since the services 204 are likely to be in an undesired state. The status of the fault condition (e.g., in the active datacenter 206) is posted to an associated coordination component (the active coordination component 202). The status can include resulting state of a service, a failure code, and/or a failure message, for example. The services (e.g., active datacenter services 204) of a datacenter can be configured to poll an associated coordination component (the active coordination component 202) at regular time intervals for instructions to stop service, continue to provide service, or to start providing services.

Consider an example where the active datacenter 206 of messaging services 204 (e.g., a mailbox service) fails due to a power outage, no services will be are running, and the DACs 214 of the active coordination component 202 are also down. When power is restored to the active datacenter 206, the services 204 can begin come up in an uncoordinated manner, and become active if left to come all the way up. Instead, the services 204 initiate a "Mommy may I" query to the DACs 214. The service online state in the DACs 214 is reset to false (or stay offline) due to the power outage. Accordingly, the DACs 214 answer all queries with a "no" response to keep the services 204 in an offline state. Thus, the services 204 do not become active (or online) until the administrator interacts with the active coordination component 202 to bring the active datacenter 206 up by changing desired server state to "online". Based on the administrator interaction, the active coordination component 202 will answer subsequent service queries with a "yes" response. The results of the action for the services 204 are then posted back as transition status to the DACs 214.

In the passive datacenter 212 (presumably where the power outage did not occur) the administrator provides input to the passive coordination component 208 to the effect that "I want my passive datacenter online". This effectively instructs the passive datacenter 212 to come online (active) while the active datacenter 206 is offline (passive).

Figure 3:
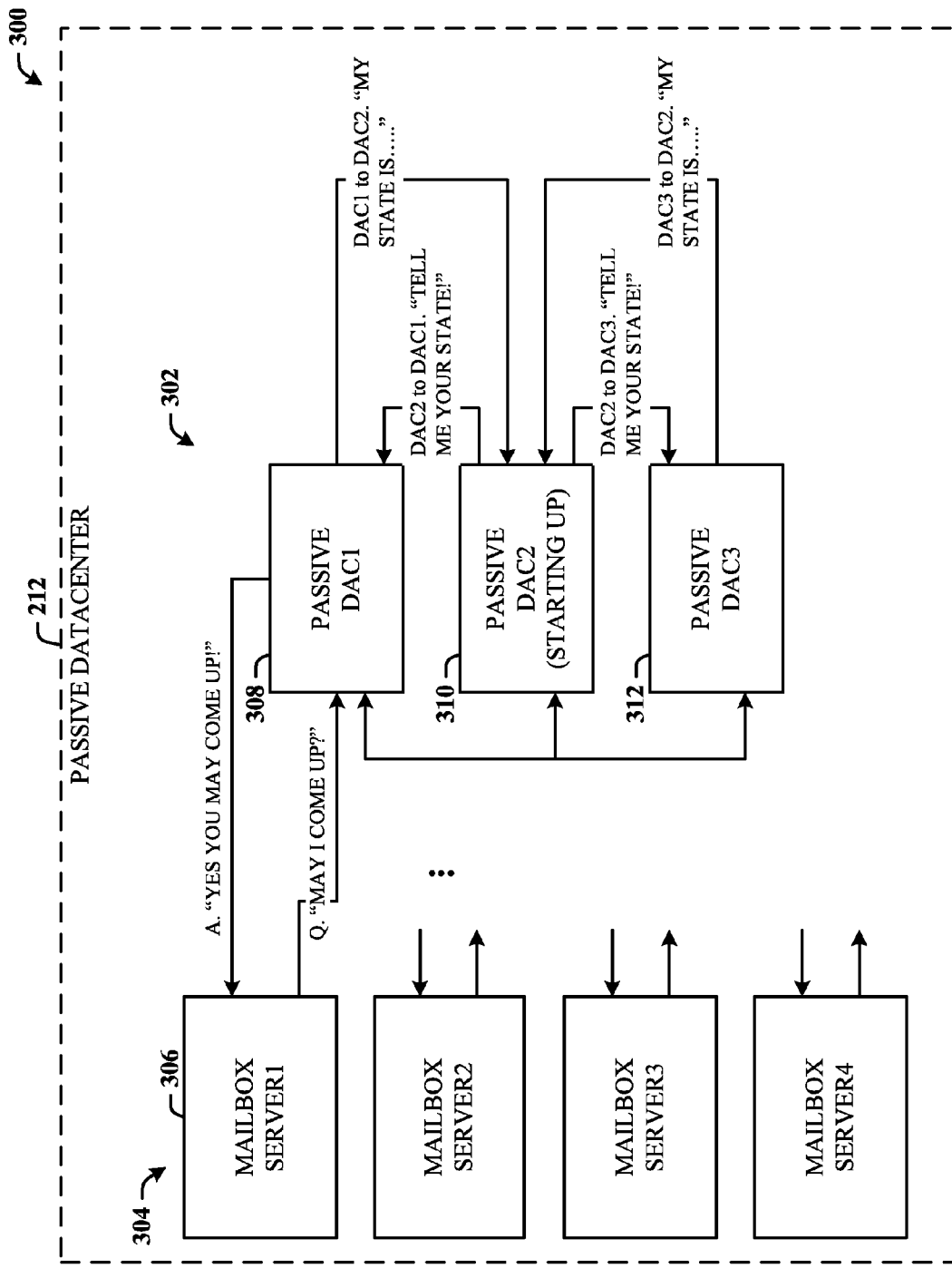
FIG. 3 illustrates an exemplary communications protocol between datacenter activation coordinators and datacenter servers.

FIG. 3 illustrates an exemplary communications protocol between datacenter activation coordinators and datacenter servers and amongst the datacenter activation coordinators themselves. The protocol is described in the context of a passive system 300 where three passive (and redundant) DACs 302 are provided to manage the passive datacenter 212 of mailbox servers 304. The figure shows the startup of DAC 310. DAC 310 queries the other DACs 308 and 312 for their associated state. Each DAC 308 and 310 responds with its state; which may be "offline", "online", or "normal". Normal allows active/passive cluster services to come online only when the two datacenters can communicate. In the "normal" case, the server makes its own decision about being online or offline. This is accomplished in the active/passive cluster environment by the server using its cluster logic to determine if it will be online or offline.

DAC 310 then assumes the state of the responses; which will agree. DAC 310 uses this state to respond to all mailbox server queries. The polling/response protocol is described in the context of server 306 querying DAC 308. When a query Q (e.g., "May I come up?") is received, the receiving DAC (e.g., DAC 308) looks at the local state (stored in DAC 308) and responds with an answer A (e.g., "Yes you may come up!").

In other words, a DAC calculates desired state of the datacenter or a server using a specific algorithm which resets the desired state to offline when all DACs 302 go offline at the same time. The DAC (a server), being redundant, employs a community view of the stored datacenter state. When a given DAC server restarts, the DAC queries the other DAC servers to determine the desired state. An initializing DAC server starts with a desired state of "offline". Only if the starting DAC server finds another DAC server reporting a desired state of "online" does the initializing DAC mark its desired state as "online". By definition, taking all DAC servers down at the same time results in a datacenter failure. In this case, the administrator restores service after this type of event by intervening and marking the desired state as "normal". The desired state can be persisted or not persisted.

As illustrated, the disclosed solution utilizes at least one redundantly deployed DAC in each datacenter to control the behavior of the messaging services in that datacenter. The DAC can control all messaging services in a datacenter, including services that run in an active/passive configuration. Each DAC controlled messaging service queries the local DAC(s) for the right to continue to or start providing service at a regular, configurable interval (e.g., approximately every thirty seconds). The DAC consults its stored state information and responds to the query such as the services may be instructed that they do not have the right, and thus, must shutdown. The DAC state information can be granular (e.g., per server or service) or datacenter wide (e.g., globally computed state). For example, the on/off state can be computed for the entire datacenter or individual servers.

When a state change is initiated the controlled services post completion status information to the local DAC. The completion status information can include, but is not limited to, resulting state of the service and/or server such as online, offline, normal, partially failed, failed, and/or in maintenance. This state can be distinct from the desired state. The state information can further include a failure code (if failed or partially failed), and failure message (if failed or partially failed).

In one implementation, the service and/or server does not update the status after a datacenter failure in that the mechanism is not deployed as an ongoing health monitoring system. In an alternative implementation, however, the service and/or server updates the status after a datacenter failure.

A service and/or server can locate its local DAC via a configured network identity. There can be multiple physical machines associated with the configured network identity. Alternatively, network load balancing can be employed. The DAC may or may not be a shared machine.

Following is a series of flow charts representative of exemplary methodologies for performing novel aspects of the disclosed architecture. While, for purposes of simplicity of explanation, the one or more methodologies shown herein, for example, in the form of a flow chart or flow diagram, are shown and described as a series of acts, it is to be understood and appreciated that the methodologies are not limited by the order of acts, as some acts may, in accordance therewith, occur in a different order and/or concurrently with other acts from that shown and described herein. For example, those skilled in the art will understand and appreciate that a methodology could alternatively be represented as a series of interrelated states or events, such as in a state diagram. Moreover, not all acts illustrated in a methodology may be required for a novel implementation.

Figure 4:
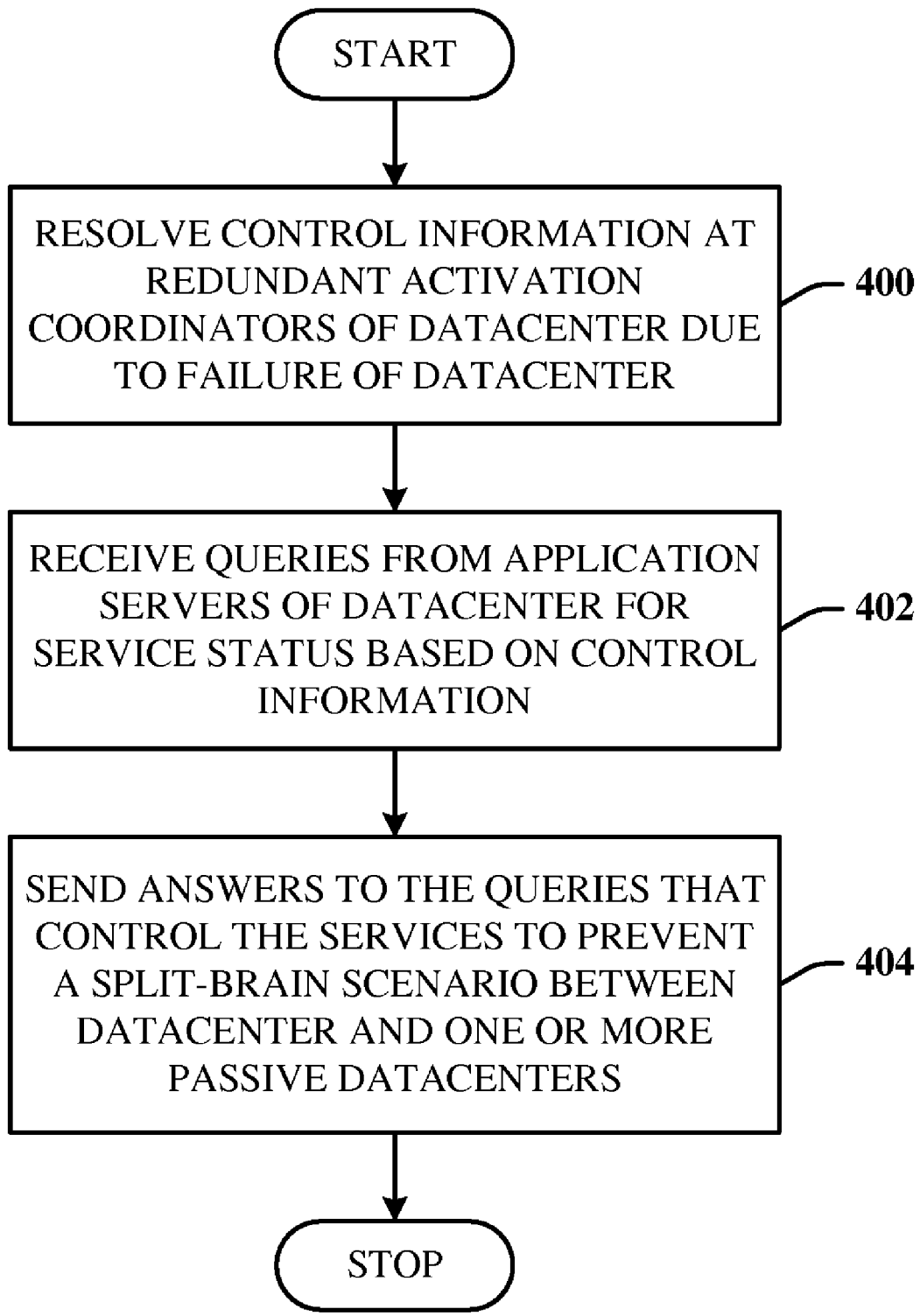
FIG. 4 illustrates a computer-implemented method of managing a datacenter.

FIG. 4 illustrates a computer-implemented method of managing a datacenter. At 400, control information at redundant activation coordinators of a datacenter is resolved due to a failure of the datacenter. At 402, queries (e.g., polling) are received from application servers of the datacenter for service status based on the control information. At 404, answers to the queries are sent that control the services to prevent a split-brain scenario between the datacenter and one or more passive datacenters.

The method can further comprise changing state of the control information in control tables of the activation coordinators to activate or deactivate the application servers. The control information can be resolved, by an activation coordinator in startup mode querying one or more other activation coordinators of the datacenter for state information and determining the control information based on the state information. The control information is manipulated manually to activate or deactivate the application servers. The redundant activation coordinators share state upon startup, each coordinator receives the queries, processes the queries, and sends the answers to the application servers associated with the queries.

The method can further comprise posting completion status information of the application servers to the redundant activation coordinators. The completion status information can include resulting state of the application servers, a failure code, and a failure message. The method can further comprise maintaining a passive datacenter in a passive mode by sending answers to queries from application servers of the passive datacenter that keep the application servers of the passive datacenter deactivated.

Figure 5:
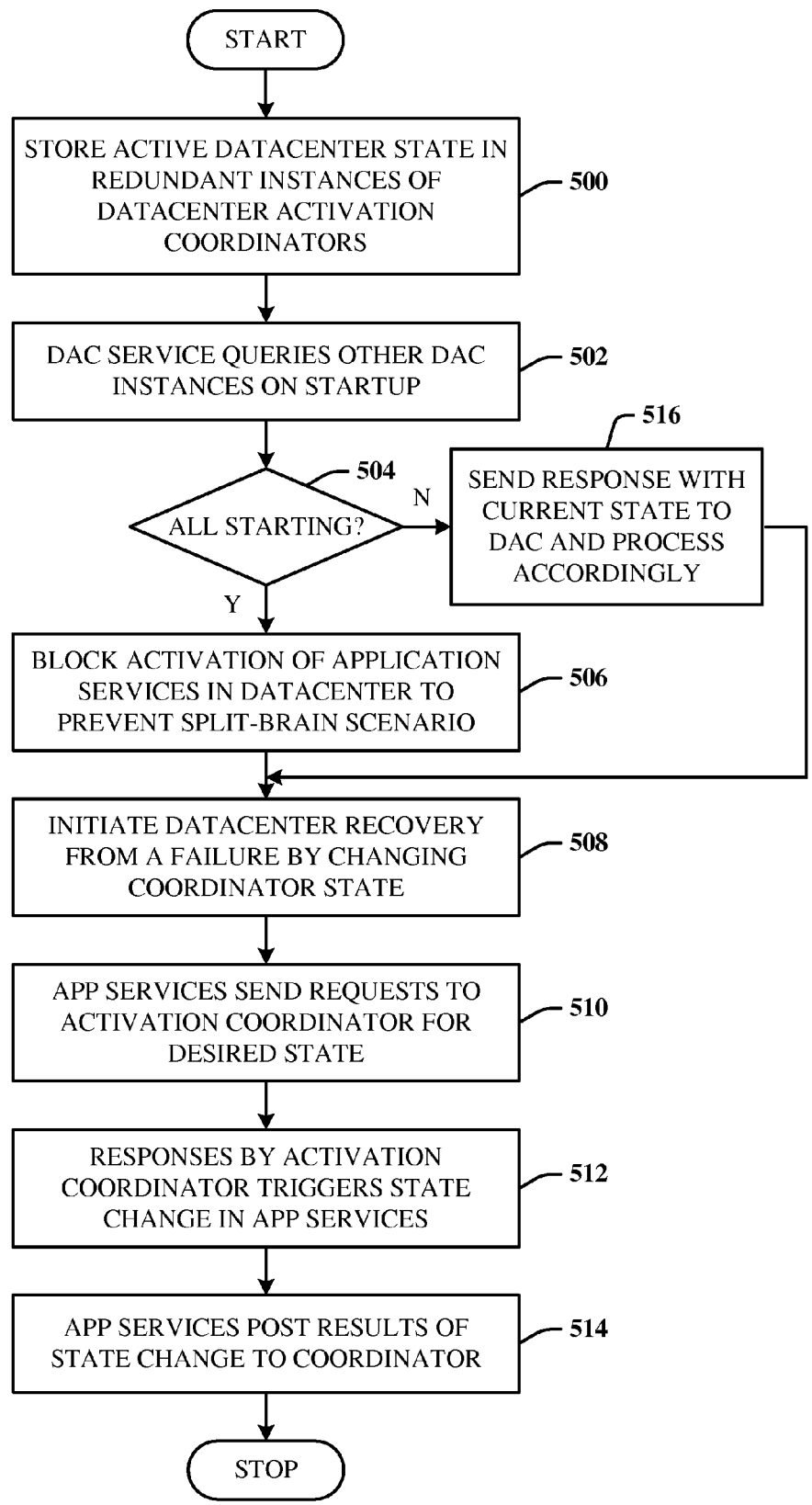
FIG. 5 illustrates a method of activating a datacenter based on state in a "Mommy may I" server.

FIG. 5 illustrates a method of managing application services based on a active datacenter failure. At 500, during normal operation, active datacenter state is stored in the redundant instances of active datacenter activation coordinators. At 502, a DAC service queries other DAC instances on startup of the DACs. The DAC startup process can be due to individual maintenance on the single DAC or due to a datacenter-wide failure. At 504, if all DAC instances are starting, the single DAC service starting up assumes a system-wide power or other failure. Alternatively, if all of the other DAC instances are running, the assumption can be that no failure has occurred and to simply assume the state of the other DAC instances. Note also that during a datacenter-wide failure that the other DAC instances are also starting up and querying the other DAC(s) for state information. Accordingly, at 506, since the other DAC instances are also starting up, all the DACs operate to block activation of the application (app) services of the datacenter to prevent a split-brain scenario with another datacenter. At 508, recovery is initiated from a datacenter-wide failure by updating the state to "online". At 510, each of the local servers subsequently sends a request to the activation coordinator for the desired state. At 512, a response from the activation coordinator triggers a state change of the servers. At 514, the result of the state change is posted back to the DAC. However, if all instances of the DAC services are not starting, flow is from 506 to 516 to send notification to an administrator, for example, and process the desired state accordingly.

As used in this application, the terms "component" and "system" are intended to refer to a computer-related entity, either hardware, a combination of hardware and software, software, or software in execution. For example, a component can be, but is not limited to being, a process running on a processor, a processor, a hard disk drive, multiple storage drives (of optical and/or magnetic storage medium), an object, an executable, a thread of execution, a program, and/or a computer. By way of illustration, both an application running on a server and the server can be a component. One or more components can reside within a process and/or thread of execution, and a component can be localized on one computer and/or distributed between two or more computers. The word "exemplary" may be used herein to mean serving as an example, instance, or illustration. Any aspect or design described herein as "exemplary" is not necessarily to be construed as preferred or advantageous over other aspects or designs.

Figure 6:
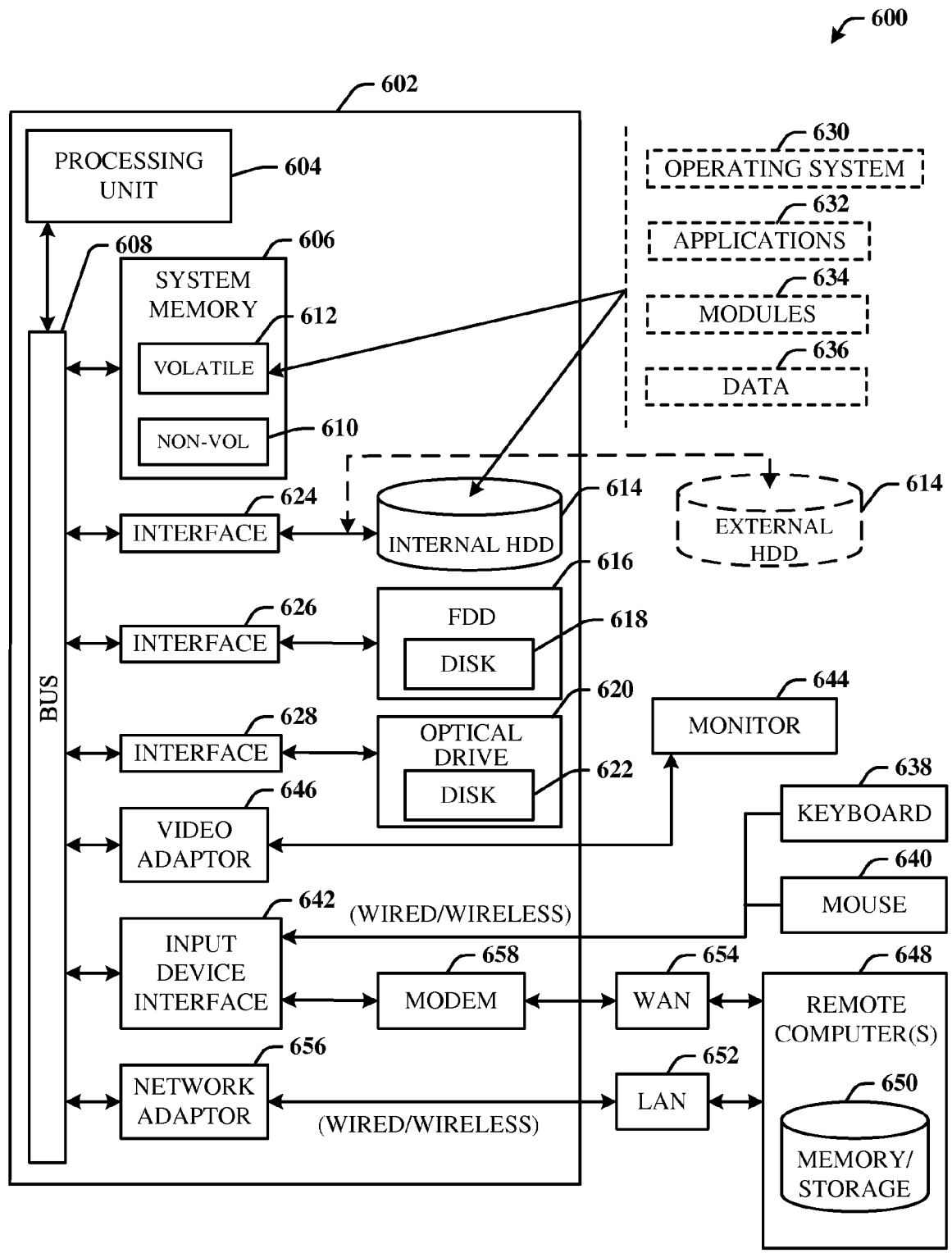
FIG. 6 illustrates a block diagram of a computing system operable to support centralized activation/deactivation control of datacenters in accordance with the disclosed architecture to prevent a split-brain scenario.

Referring now to FIG. 6, there is illustrated a block diagram of a computing system 600 operable to support centralized activation/deactivation control of datacenters in accordance with the disclosed architecture to prevent a split-brain scenario. In order to provide additional context for various aspects thereof, FIG. 6 and the following discussion are intended to provide a brief, general description of a suitable computing system 600 in which the various aspects can be implemented. While the description above is in the general context of computer-executable instructions that may run on one or more computers, those skilled in the art will recognize that a novel embodiment also can be implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, as well as personal computers, hand-held computing devices, microprocessor-based or programmable consumer electronics, and the like, each of which can be operatively coupled to one or more associated devices.

The illustrated aspects can also be practiced in distributed computing environments where certain tasks are performed by remote processing devices that are linked through a communications network. In a distributed computing environment, program modules can be located in both local and remote memory storage devices.

A computer typically includes a variety of computer-readable media. Computer-readable media can be any available media that can be accessed by the computer and includes volatile and non-volatile media, removable and non-removable media. By way of example, and not limitation, computer-readable media can comprise computer storage media and communication media. Computer storage media includes volatile and non-volatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital video disk (DVD) or other optical disk storage, magnetic cassettes, magnetic tape, magnetic disk storage or other magnetic storage devices, or any other medium which can be used to store the desired information and which can be accessed by the computer.

With reference again to FIG. 6, the exemplary computing system 600 for implementing various aspects includes a computer 602 having a processing unit 604, a system memory 606 and a system bus 608. The system bus 608 provides an interface for system components including, but not limited to, the system memory 606 to the processing unit 604. The processing unit 604 can be any of various commercially available processors. Dual microprocessors and other multi-processor architectures may also be employed as the processing unit 604.

The system bus 608 can be any of several types of bus structure that may further interconnect to a memory bus (with or without a memory controller), a peripheral bus, and a local bus using any of a variety of commercially available bus architectures. The system memory 606 can include non-volatile memory (NON-VOL) 610 and/or volatile memory 612 (e.g., random access memory (RAM)). A basic input/output system (BIOS) can be stored in the non-volatile memory 610 (e.g., ROM, EPROM, EEPROM, etc.), which BIOS are the basic routines that help to transfer information between elements within the computer 602, such as during start-up. The volatile memory 612 can also include a high-speed RAM such as static RAM for caching data.

The computer 602 further includes an internal hard disk drive (HDD) 614 (e.g., EIDE, SATA), which internal HDD 614 may also be configured for external use in a suitable chassis, a magnetic floppy disk drive (FDD) 616, (e.g., to read from or write to a removable diskette 618) and an optical disk drive 620, (e.g., reading a CD-ROM disk 622 or, to read from or write to other high capacity optical media such as a DVD). The HDD 614, FDD 616 and optical disk drive 620 can be connected to the system bus 608 by a HDD interface 624, an FDD interface 626 and an optical drive interface 628, respectively. The HDD interface 624 for external drive implementations can include at least one or both of Universal Serial Bus (USB) and IEEE 1394 interface technologies.

The drives and associated computer-readable media provide nonvolatile storage of data, data structures, computer-executable instructions, and so forth. For the computer 602, the drives and media accommodate the storage of any data in a suitable digital format. Although the description of computer-readable media above refers to a HDD, a removable magnetic diskette (e.g., FDD), and a removable optical media such as a CD or DVD, it should be appreciated by those skilled in the art that other types of media which are readable by a computer, such as zip drives, magnetic cassettes, flash memory cards, cartridges, and the like, may also be used in the exemplary operating environment, and further, that any such media may contain computer-executable instructions for performing novel methods of the disclosed architecture.

A number of program modules can be stored in the drives and volatile memory 612, including an operating system 630, one or more application programs 632, other program modules 634, and program data 636. Where the computer 602 is employed as a coordination component (e.g., coordination component 116), the one or more application programs 632, other program modules 634, and program data 636 can include the response component 112, the server control information 110, the request component 102, the active coordination component 202, and the active DACs 214, for example. This applies similarly to the passive coordination components (118, 208 and 302).

One or more of these components can be embodied as services/servers. For example, the DACs and coordination components can be services (or instances) operating to perform the desired functions as described supra. The computer 602 can be the physical system that supports the components described herein. A datacenter (e.g., datacenter 102, passive datacenter 112, etc.) can comprise multiple computers 602 that host one or more operational services (e.g., services 106 which may or may not fault.

All or portions of the operating system, applications, modules, and/or data can also be cached in the volatile memory 612. It is to be appreciated that the disclosed architecture can be implemented with various commercially available operating systems or combinations of operating systems.

A user can enter commands and information into the computer 602 through one or more wire/wireless input devices, for example, a keyboard 638 and a pointing device, such as a mouse 640. Other input devices (not shown) may include a microphone, an IR remote control, a joystick, a game pad, a stylus pen, touch screen, or the like. These and other input devices are often connected to the processing unit 604 through an input device interface 642 that is coupled to the system bus 608, but can be connected by other interfaces such as a parallel port, IEEE 1394 serial port, a game port, a USB port, an IR interface, etc.

A monitor 644 or other type of display device is also connected to the system bus 608 via an interface, such as a video adaptor 646. In addition to the monitor 644, a computer typically includes other peripheral output devices (not shown), such as speakers, printers, etc.

The computer 602 may operate in a networked environment using logical connections via wire and/or wireless communications to one or more remote computers, such as a remote computer(s) 648. The remote computer(s) 648 can be a workstation, a server computer, a router, a personal computer, portable computer, microprocessor-based entertainment appliance, a peer device or other common network node, and typically includes many or all of the elements described relative to the computer 602, although, for purposes of brevity, only a memory/storage device 650 is illustrated. The logical connections depicted include wire/wireless connectivity to a local area network (LAN) 652 and/or larger networks, for example, a wide area network (WAN) 654. Such LAN and WAN networking environments are commonplace in offices and companies, and facilitate enterprise-wide computer networks, such as intranets, all of which may connect to a global communications network, for example, the Internet.

When used in a LAN networking environment, the computer 602 is connected to the LAN 652 through a wire and/or wireless communication network interface or adaptor 656. The adaptor 656 can facilitate wire and/or wireless communications to the LAN 652, which may also include a wireless access point disposed thereon for communicating with the wireless functionality of the adaptor 656.

When used in a WAN networking environment, the computer 602 can include a modem 658, or is connected to a communications server on the WAN 654, or has other means for establishing communications over the WAN 654, such as by way of the Internet. The modem 658, which can be internal or external and a wire and/or wireless device, is connected to the system bus 608 via the input device interface 642. In a networked environment, program modules depicted relative to the computer 602, or portions thereof, can be stored in the remote memory/storage device 650. It will be appreciated that the network connections shown are exemplary and other means of establishing a communications link between the computers can be used.

The computer 602 is operable to communicate with wire and wireless devices or entities using the IEEE 802 family of standards, such as wireless devices operatively disposed in wireless communication (e.g., IEEE 802.11 over-the-air modulation techniques) with, for example, a printer, scanner, desktop and/or portable computer, personal digital assistant (PDA), communications satellite, any piece of equipment or location associated with a wirelessly detectable tag (e.g., a kiosk, news stand, restroom), and telephone. This includes at least Wi-Fi (or Wireless Fidelity), WiMax, and Bluetooth™ wireless technologies. Thus, the communication can be a predefined structure as with a conventional network or simply an ad hoc communication between at least two devices. Wi-Fi networks use radio technologies called IEEE 802.11x (a, b, g, etc.) to provide secure, reliable, fast wireless connectivity. A Wi-Fi network can be used to connect computers to each other, to the Internet, and to wire networks (which use IEEE 802.3-related media and functions).

What has been described above includes examples of the disclosed architecture. It is, of course, not possible to describe every conceivable combination of components and/or methodologies, but one of ordinary skill in the art may recognize that many further combinations and permutations are possible. Accordingly, the novel architecture is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A computer-implemented system for managing activation and deactivation of servers or services in a datacenter, comprising:
    a coordination component of a cluster deployment for controlling activation of a datacenter to prevent inappropriate activations;
    a request component of the coordination component for receiving requests from a query component of servers of the datacenter for server control information indicating a state of the servers;
    a response component of the coordination component for sending answers to the servers in response to the requests from the query component for server control information to control the servers based on the indicated state to prevent a split-brain scenario between the datacenter and one or more other datacenters; and
    a processor operable to execute computer-executable instructions associated with at least one of the datacenter activation coordinator, the request component, or the response component.

2. The system of claim 1, wherein the server control information relates to desired state for the servers being one of normal, offline, or online.

3. The system of claim 1, wherein the server control information applies to each of the datacenter servers or a subset of the datacenter servers.

4. The system of claim 1, wherein the servers of the datacenter are mailbox servers managed according to an active/passive redundancy model.

5. The system of claim 1, wherein the coordination component is configured to process an instruction to maintain the servers in an offline state to prevent the split-brain scenario.

6. The system of claim 5, wherein the coordination component includes redundant instances of datacenter activation coordinators, the coordinators query each other on startup to determine desired state of the servers in the datacenter, and based on the state, block activation of the servers in the datacenter to prevent the split-brain scenario.

7. A computer-implemented system for managing redundant datacenters, comprising:
    a passive coordination component of a passive datacenter for controlling passive servers of the passive datacenter based on a queried passive server state, the passive coordination component comprises multiple redundant passive data activation coordinators that interface to the passive servers for receiving and processing service queries to maintain the passive servers in an online state in response to a datacenter-wide failure of an active datacenter;
    an active coordination component of the active datacenter for controlling active servers of the active datacenter based on a queried active server state, the active coordination component comprises multiple redundant active data activation coordinators that interface to the active servers for receiving and processing service queries to maintain the active servers in an offline state in response to a datacenter-wide failure of the active datacenter to prevent a split-brain situation with the passive datacenter; and
    a processor operable to execute computer-executable instructions associated with at least one of the passive coordination component or the active coordination component.

8. The system of claim 7, wherein the active coordination component blocks activation of message services operating in an active/passive clustered model after a complete active datacenter failure.

9. The system of claim 7, wherein status of a directed transition associated with the service state transition is posted to the coordination component, the status includes resulting state of at least one of a service, a failure code, or a failure message.

10. The system of claim 7, wherein the message services of the active datacenter poll the coordination component at regular time intervals for updated desired state that indicates the message services are to go online.

11. The system of claim 7, wherein the passive coordination component is administered manually to bring the passive datacenter online.

12. The system of claim 7, wherein the redundant activation coordinators of the passive coordination component and the active coordination component intercommunicate to resolve state of control information for controlling associated messaging servers to an offline or online state.

13. A computer-implemented method of managing activation and deactivation of servers or services in a datacenter, comprising acts of:

resolving control information indicating activation states of application servers at redundant activation coordinators of a datacenter due to failure of the datacenter;

receiving and processing queries from the application servers of the datacenter at the redundant activation coordinators for activation service status based on the control information;

sending answers to the queries from the redundant activation coordinators that control the application servers to activate or deactivate the application servers, to prevent a split-brain scenario between the datacenter and one or more passive datacenters; and utilizing a processor that executes instructions stored in memory to perform at least one of the acts of resolving, receiving, or sending.

14. The method of claim 13, further comprising changing state of the control information in control tables of the activation coordinators to activate or deactivate the application servers.

15. The method of claim 13, wherein the control information is resolved by an activation coordinator in startup mode, by querying one or more other activation coordinators of the datacenter for state information and determining the control information based on the state information.

16. The method of claim 15, wherein the control information is manipulated manually to activate or deactivate the application servers.

17. The method of claim 13, wherein the redundant activation coordinators share state upon startup, each coordinator receives the queries, processes the queries, and sends the answers to the application servers associated with the queries.

18. The method of claim 13, further comprising posting completion status information of the application servers to the redundant activation coordinators.

19. The method of claim 18, wherein the completion status information includes resulting state of the application servers, a failure code, and a failure message.

20. The method of claim 13, further comprising maintaining a passive datacenter in a passive mode by sending answers to queries from application servers of the passive datacenter that keep the application servers of the passive datacenter deactivated.

* * * * *